(12) United States Patent  (10) Patent No.: US 8,181,872 B2
Lebaschi et al.  (45) Date of Patent: May 22, 2012

(54) IMAGING DEVICE AND METHOD FOR CONCURRENT IMAGING OF OPPOSITE SIDES OF AN IDENTIFICATION CARD OR DOCUMENT

(76) Inventors: Ali Lebaschi, San Diego, CA (US); Hak-Soo Kim, San Diego, CA (US)

( * ) Notice: Subject to any disclaimer, the term of this patent is extended or adjusted under 35 U.S.C. 154(b) by 938 days.

(21) Appl. No.: 12/156,100

(22) Filed: May 28, 2008

(65) Prior Publication Data

US 2009/0073503 A1    Mar. 19, 2009

Related U.S. Application Data

(60) Provisional application No. 60/994,612, filed on Sep. 19, 2007.

(51) Int. Cl.
*G06K 7/00* (2006.01)
(52) U.S. Cl. .......................... 235/440; 235/380; 235/454
(58) Field of Classification Search .................. 235/440, 235/380, 454; 382/135, 181; 358/505
See application file for complete search history.

(56) References Cited

U.S. PATENT DOCUMENTS

| 2004/0028266 A1* | 2/2004 | Jones et al. .................... 382/135 |
| 2004/0165233 A1* | 8/2004 | Wang ............................ 358/505 |
| 2005/0087598 A1* | 4/2005 | Yamanaka et al. ............ 235/440 |
| 2006/0072822 A1* | 4/2006 | Hatzav et al. ................. 382/181 |

* cited by examiner

*Primary Examiner* — Michael G Lee
*Assistant Examiner* — Kristy A Haupt
(74) *Attorney, Agent, or Firm* — Donn K. Harms

(57) ABSTRACT

A device and method for imaging dual sided documents for authentification of the document. A document such as a driver's license traverses a linear flowpath into and out of a housing having a darkened interior. The document is segmentally imaged under a plurality of different light spectrums during travel along the flowpath. A data processor and software engaged to an imager capturing the segmented images assembles complete images of the document under one or a plurality of the light spectrums employed to yield a viewable rendition of both sides of the document to ascertain the presence of proper indicia to validate the document. Also provided are a magnetic strip reader and bar code reader engaged to the data processor wherein data may be extracted therefrom for comparison to the images reviewed.

8 Claims, 5 Drawing Sheets

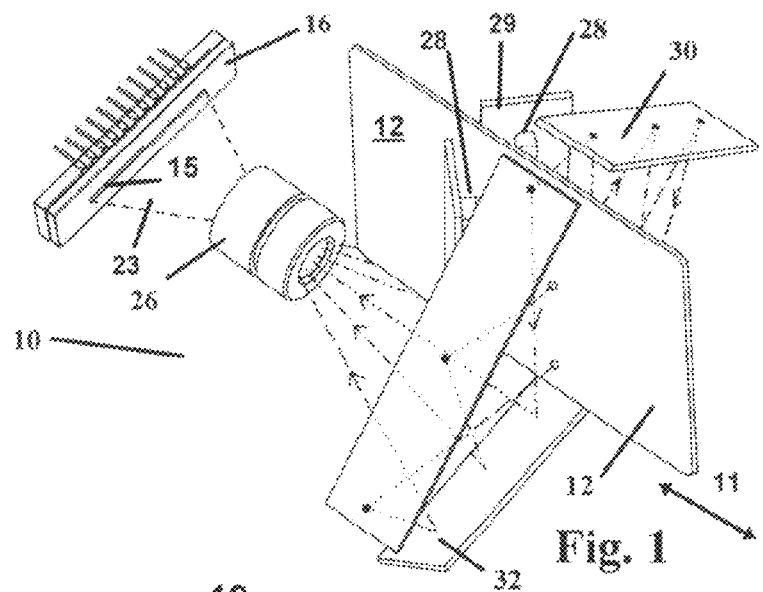
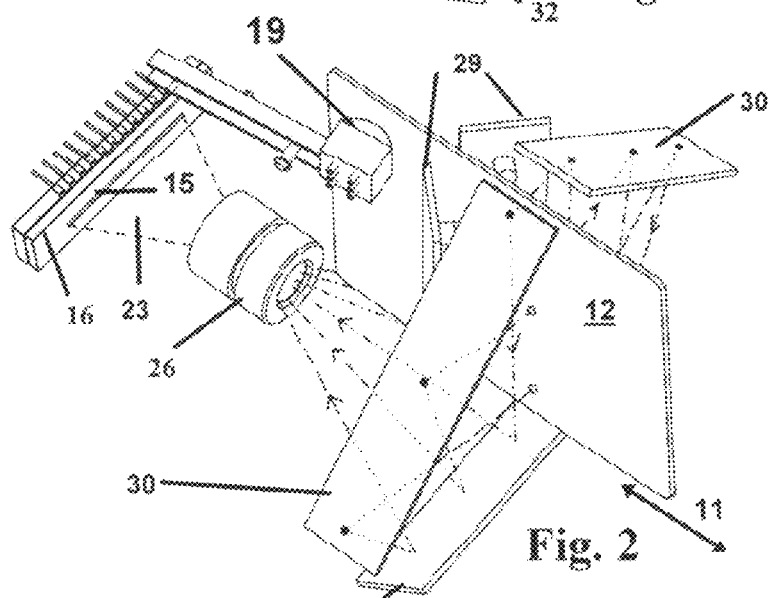
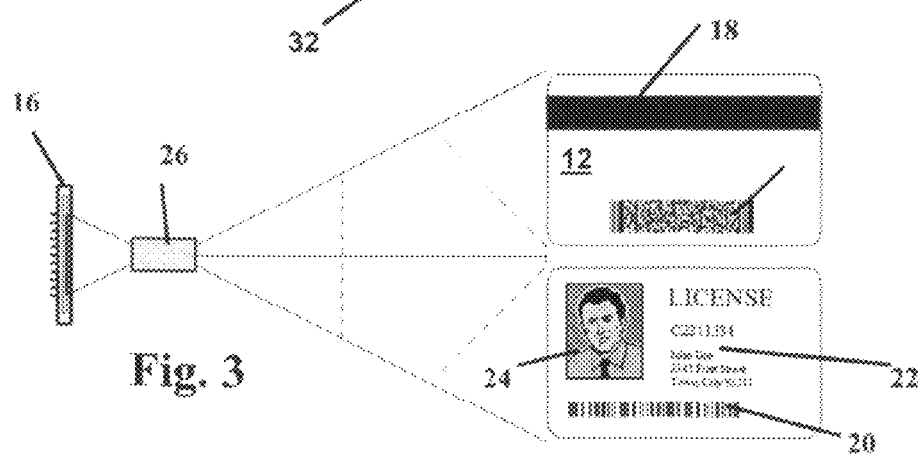

IMAGING DEVICE AND METHOD FOR CONCURRENT IMAGING OF OPPOSITE SIDES OF AN IDENTIFICATION CARD OR DOCUMENT

FIELD OF THE INVENTION

This application claims the benefit of U.S. Provisional Application No. 60/994,612 filed Sep. 19, 2007, and incorporated herein in its entirety by reference. The disclosed device relates to an imaging of dual sided documents. More particularly it relates to a device for imaging two-sided documents commonly employed for identification such as drivers' licenses, passports, business and government identification cards, and other such two-sided documents having hidden markers and validating the authenticity of such documents using varying light spectrums and concurrent imaging of both sides of the document.

BACKGROUND OF THE INVENTION

Subsequent to recent heightened security, government and private security measures have continued to increase worldwide. Consequently, there is a continued need for business and government security personnel to inspect and ascertain the identification cards of employees and citizens and to ascertain their authenticity and scope. Further, bars and nightclubs and liquor stores which serve alcohol are under a constant threat of fines and loss of their liquor license should they serve alcohol to an individual who is underage. Inspecting the identification of patrons of such establishments and validating its authenticity is therefore an important daily task.

However, with the advent of ever more advanced home and business computers and ever more accurate and high definition color printers, forging and manufacturing false identification cards, passports, employment identification cards, and drivers' licenses and the like has become easier. While forging a driver's license a decade ago was a cut and paste type of an operation which would generally be laminated to appear authentic, current computers and printers with appropriate graphic reproduction software place the ability to create genuine appearing, yet forged identification documents, in the hands of teenagers.

As a consequence, there is an ever more pressing need for business owners, bar and liquor store owners, banks, and government employees such as the TSA checking airline passengers, to be able to read and visually ascertain the authenticity and current validity of a presented piece of identification. Documents such as drivers' licenses in the past decade have included many types of security and authenticity factors which are imprinted directly onto the identification card. These can be inks that fluoresce, inks that are visible only under certain light spectrums, hidden indicia in identification photos, printed bar codes, and magnetic strips which are encoded. Frequently a plurality of these types of security and authenticity measures are imprinted on both sides of a driver's license or ID and can serve to validate that the ID is current and can authenticate the ID as validly issued rather than forged.

However, presently, most small businesses such as a bar or restaurant do not have the personnel trained to spot forgeries through comparison of imprinted authenticity and validity markers. Further, because the equipment to read and discern the various different types of security features is both bulky and expensive, business and even government venues do not employ it. Instead, businesses and government employees rely on the eye of a bouncer or gatekeeper at a restaurant or bar, and government relies on personnel such as a counter clerk or TSA agent, both of whom with little training and less equipment must try and spot forged identifications without the aid of variable light wavelengths and magnetic and optical strip readers and comparison of duplicate information on each.

One major impediment in imaging and detecting the authenticity and current validity of drivers' licenses and identification cards using conventional scanning machinery is the fact that they are stiff by nature due to their need for longevity. Most two sided document readers and imagers depend on running the document being scanned through a serpentine path in the device on a track through curves and ejecting it at the end of the serpentine path. While traversing this path, the card is optically viewed in a number of positions to try and image spectrum viewable security features for comparison. Being short and stiff, such cards are not well adapted to follow the conventional serpentine path required for imaging two sides. Further, such card readers tend to be very bulky due to the elaborate pathways the card must follow and the different multiple imaging stations along the path. Adding to the problem with such conventional imaging devices is that CCD's and CMOS-style digital imaging chips are expensive. Consequently employing two to image both sides of a document doubles the cost. Additionally two independent image capturing components require a doubling of calibration, lighting, and double the amount of things that can go wrong.

Accordingly, there is an unmet need for an imaging device that will scan both sides of either a flexible or relatively stiff identification card such as a driver's license or credit card style ID, which has a reduced size and footprint in use at such venues as an airport, bar, or company or government building point of entry. Such a device should provide for imaging of both sides of the card or document concurrently by a single electronic imaging device to thereby reduce costs and initial and ongoing calibration requirements. Such a device, due to the nature of people standing in lines and crowds where the identification is generally checked, and credit cards employed, should serve to increase speed through a checkpoint rather than slowing it as is the result with conventional devices. Further, such a device should eliminate the serpentine path for the document being checked and should provide the shortest and fastest path in and out of the device as is possible while achieving concurrent images of both sides of the document under a plurality of illumination spectrums required to image authenticity markings. Further, such a device should be especially well adapted to image both sides of a driver's license or ID card concurrently in a highly registered imaging between the two sides and to produce images that are easily readable and comparable on a video display for the user.

SUMMARY OF THE INVENTION

The disclosed device and method herein employs unique optics which enables it to employ a very short and unique flow path for documents such as drivers' licenses and identification cards and other identification documents in and out of the device. During this short flowpath through the device, a plurality of light spectrums are sequentially reflected from both sides of the inserted ID to provide a means to easily image and ascertain the existence of hidden indicia and security features which must be checked to ascertain document authenticity and current validity. A mechanism employing a motor and wheels provides for automatic movement into and out of the device during a scan. Employing a short and inline flowpath for the ID or document inserted and unique lighting, optical reflections and imagers allow for insertion and removal of the card or ID from a single slot in the reader device. The employment of software adapted to the task of ascertaining the current validity and authenticity of the document or ID by one or a combination of optical character recognitions, and employing sequential light spectrums to ascertain the presence and proper location of hidden markers can provide a valuable automation to the process of checking such documents. The short flowpath and employment of unique optics and light spectrum illumination allows for a device having a very small footprint and therefore able to be employed at inspection stations where space is sparse.

As shown in the drawings and described herein, the disclosed device is a self-contained motorized peripheral unit designed to capture and process the images of both sides of a driver's license, credit card, employment ID card, or similar credit card style identification card. The device also has the ability to image and read 2D or 1D bar codes frequently encoded on such ID cards with verification information and can also read encoded magnetic strip data which also is employed for age verification and/or authentication of the ID and holder.

In operation, images of both sides of the inserted document or card are concurrently captured to memory and then internally processed. This allows the information to become immediately available for further verification of the ID itself and matching it to the person presenting it.

The device employs a unique scanning and imaging technology enabling it to capture images of both sides of the ID, card, or document inserted by employing five different light sources sequentially. This enables the system not only to read visible informational indicia such as barcode and texts and photos, but also allows the device to discern hidden authentication indicia being employed on such documents.

The process of validating the ID is accomplished by viewing or comparing one or a plurality of specific features of the ID card or document inserted which only appear visible for capture under a specific light source. The light sources present in the device project light in sequential frequencies or spectrums currently including UV (365 nm) Blue (470 nm) Green (525 nm) Red (625 nm) and IR (850 nm). Employing these individual light spectrums in a novel sequential lighting arrangement also allows concurrent illumination should combinations of the spectrum be required or white light to capture more accurate visible colors. Thus colored renditions can be assembled electronically from the light reflected at the various wavelengths. This accuracy of color reproduction further enhances the processes validating and authenticating ID's and documents in that it allows for watermark and Original-Color-Print detection. Using onboard or networked information for comparison, the current validity of the identification in the case of expiring documents and the authenticity in the case of valid issuance, as well as matching it to the presenter, can be handled at a very detailed level.

In addition to employing LED's to project individual light sources for concurrent or sequential imaging, a unique optical path design enables the device to capture the entire portion of both sides of the ID or document such as a state driver's license, employing only a single optical sensor (CCD) to digitize the captured images. Employing the unique reflective path allowing for this single CCD not only reduces the system cost but also allows for very easy calibration for image comparison of both sides of a document since all images are captured from the same position rather than multiple image sensors at multiple points as in conventional devices.

In addition to onboard microprocessor, memory, and optical components, the device has means for communication with a computer network using either wireless or wired ports. Power is supplied by onboard batteries, or if the device is stationary, it can be by AC adapter.

In this respect, before explaining at least one embodiment of the device and method herein in detail, it is to be understood that the invention is not limited in its application to the details of construction, and to the arrangement of the components or method steps set forth in the following description or illustrated in the drawings. The invention is thus capable of other embodiments and of being practiced and carried out in various ways and in different order of execution. Also, it is to be understood that the phraseology and terminology employed herein are for the purpose of description and should not be regarded as limiting.

As such, those skilled in the art will appreciate that the conception upon which the imaging device and method are based may readily be utilized as a basis for designing of other two-sided imaging systems for carrying out the several purposes of the present invention. It is important, therefore, that the claims be regarded as including such equivalent construction insofar as they do not depart from the spirit and scope of the present invention.

It is an object of this invention to provide a driver's license or similar identification document reader which can ascertain the authenticity of the document inserted using a single imager and short linear flowpath for the document into and out of the device.

It is a further object of the invention to provide such a device for imaging two sides of a driver's license or identification card or document, which employs a single imaging point and one imager to capture all images of both sides in order to reduce cost and calibration requirements.

It is a further object of this invention to employ a plurality of specific wavelengths of light inside a housing for lighting the surface to be imaged to allow the imager to process images from an inserted document thereby, using multiple images under one or a plurality of light wavelengths to ascertain hidden authentication features.

These together with other objects and advantages which will become subsequently apparent reside in the details of the construction and method as more fully hereinafter described and claimed, reference being had to the accompanying drawings forming a part thereof, wherein like numerals refer to like parts throughout.

BRIEF DESCRIPTION OF DRAWING

FIG. 1 is a perspective depiction of the internal workings of the optical system of the device employing mirrors to communicate both sides of a moving document to a single imaging device for capture.

FIG. 2 shows the additional function of a magnetic strip reader which may be concurrently employed to read magnetic strip information and ascertain correct insertion.

FIG. 3 is an expanded or unfolded field of view of the device without showing the mirrors employing dotted lines to show locations of the three mirrors which project concurrent images of both sides to the capturing device.

DETAILED DESCRIPTION OF PREFERRED EMBODIMENTS

Figure 8:
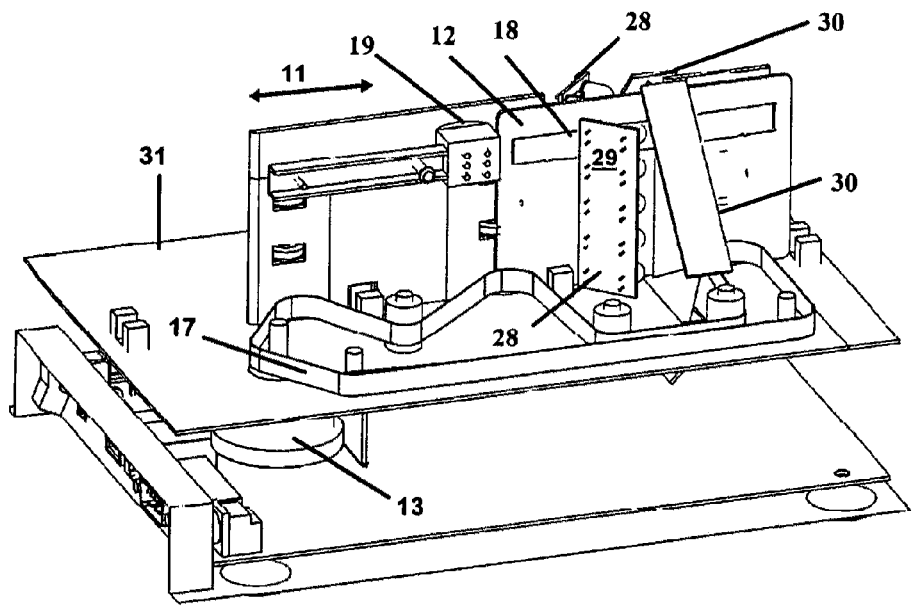
FIG. 8 shows the belt pulling the ID card translating it into and out of the linear flowpath above the imager.
Figure 9:
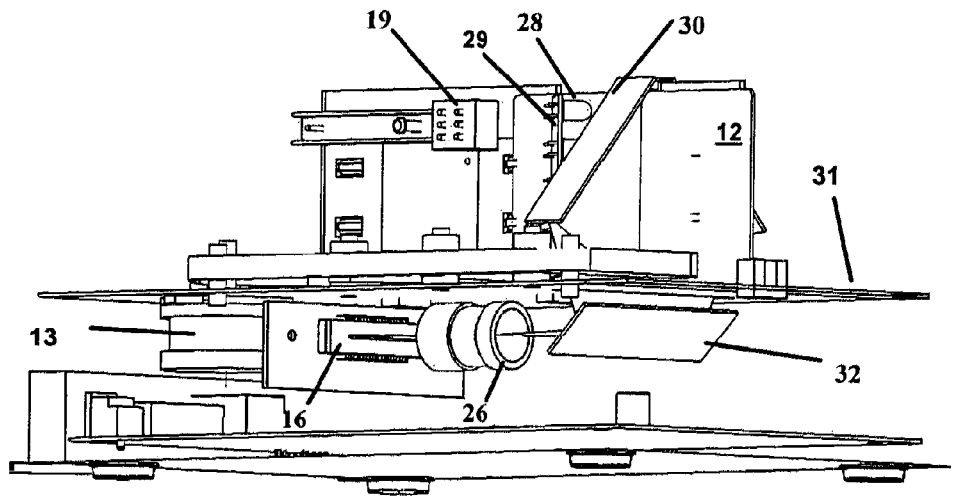
FIG. 9 depicts the final horizontal imaging mirror positioned inline with a lens focusing the segmental image of each side of the card to the imager.

Referring now to the drawings in FIGS. 1-10, some preferred embodiments of the present invention in current preferred modes are shown and described. The device 10 as shown in FIG. 1 and other figures is adapted to be easily employed for imaging two-sided documents such ID type documents such as a driver's license card 12. Using a drive mechanism as shown in FIGS. 8-9 which employs a reversible motor 13 to drive a belt 17 to translate the card 12 along the linear flowpath 11 into and out of a housing 14, the device 10 offers easy review and authentication of presented identifications such as drivers' license card 12. The translation into and out of the housing 14 is timed to allow strobing of the individual LED's 28 to illuminate the card 12 to capture segmented images during each such illumination of each LED 28 in each light frequency to thereby assemble electronically one or a plurality of different images of the card 12 in each respective spectrum of illumination employed.

In operation the card 12 or other two sided document to be viewed and/or checked for authenticity and/or current validity as to issuance date, is inserted into and exited from an inline linear flowpath 11 inside a housing 14. The drive mechanism will translate the card 12 into and out of the housing 14 for a duration sufficient to illuminate the card 12 with the LED's 28 and capture the necessary segments of card image to assemble an total image electronically of the card 12 under each spectrum, or combine the segments in one or a plurality of spectrums electronically, to yield an assembled image of the card 12 showing the different hidden and visible indica combined. The assembled image of the card 12 thus can show the hidden indica which only appears under certain light spectrums along with the visible indica to allow for easy verification of the validity and authenticity of the card 12 when projected on a video monitor such as the depiction in FIG. 3 showing both sides of the card 12 concurrently as they are seen by the imager 16.

Inside the housing 14 the device 10 employs a unique combination of means for illumination and means for optical reflection allowing the use of a single imager 16 which enables a two-sided image to be captured concurrently by the imager 16 from assembled segments of images from the strobing LED's 28 in their respective spectrum as shown in FIG. 3. The segments are sized as a function of the width of the mirrors employed.

During translation into and out of the device 10, both sides of an identification card 12 such as a driver's license or employment ID or other double sided document are concurrently captured by the imager 16 and thus the two images are registered with each other throughout the imaging process allowing for positions of indicia on each side to be compared with each other as another means to ascertain authenticity. Because of the short linear flowpath 11 allowed by the unique concurrent imaging of both sides, and the fact that the LED's capturing segments of the assembled image can strobe both during the incoming and exiting movement of the card 12, a license or other inserted card 12 or ID only needs to move into the housing 14 a short distance, thereby allowing for a small housing 14, shown in FIG. 5. Additionally providing for the small footprint is the placement of the imager 16, lens 26, and horizontal mirror 32 on one side of the circuit board 31 and the angled reflective mirrors 30 and linear flowpath 11 for the card 12 on the opposite side. This stacked arrangement of the components renders the device 10 much smaller than would be the case conventionally.

The electronic imager 16 such as a CCD chip, or other means to capture an illuminated image and convert it to a digital image, in addition to capturing segmented images of the card 12 surface under different light spectrums, has the ability to capture and digitize images of 2D or 1D bar codes 20, which are frequently encoded on such ID cards or licenses card 12 and or ID such as company and government issued security cards. The captured bar codes may be processed by software adapted to the task to extract their data once captured. Optionally but preferred, the device 10 can also read an encoded magnetic strip 18 which frequently contains data about the holder and about the document on which it is place, using a magnetic strip reader 19 in the proper position as shown in FIGS. 8-9. Both the optically readable bar code 20 and the magnetic strip 18 are used by many government and private agencies to encode hidden data and are thus employable to verify the indicia 22 such as text and photo 24 on the card 12 or other ID containing them.

Figure 4:
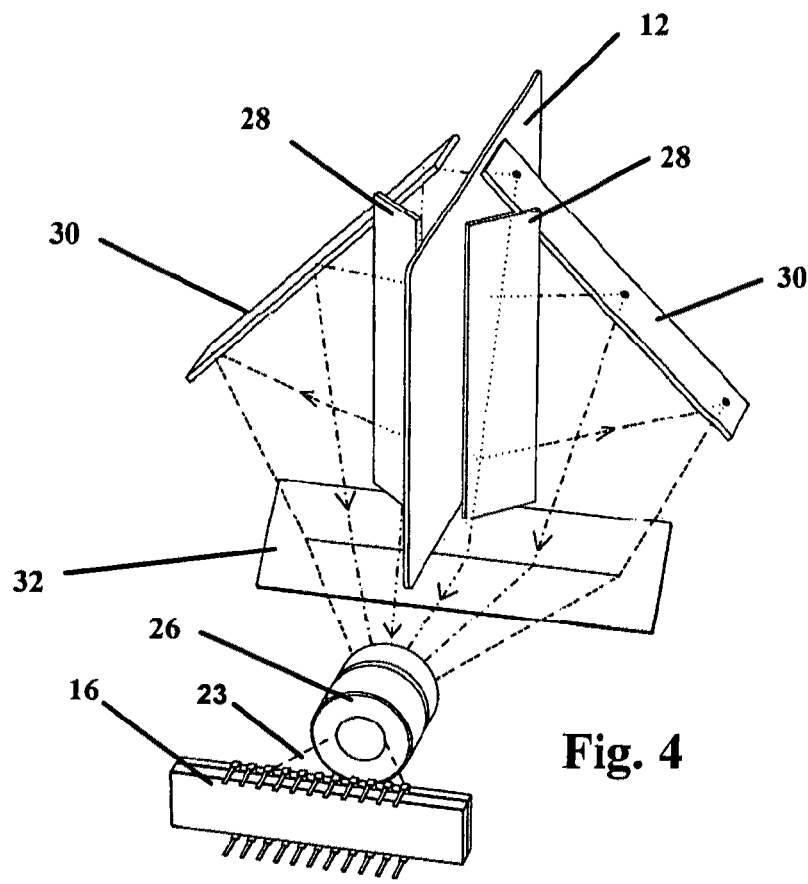
FIG. 4 is an end view of the unique optical arrangement of mirrors to reflect both sides of the ID card to a final mirror under the flowpath for capture by the imaging device mounted traverse to the flowpath.
Figure 5:
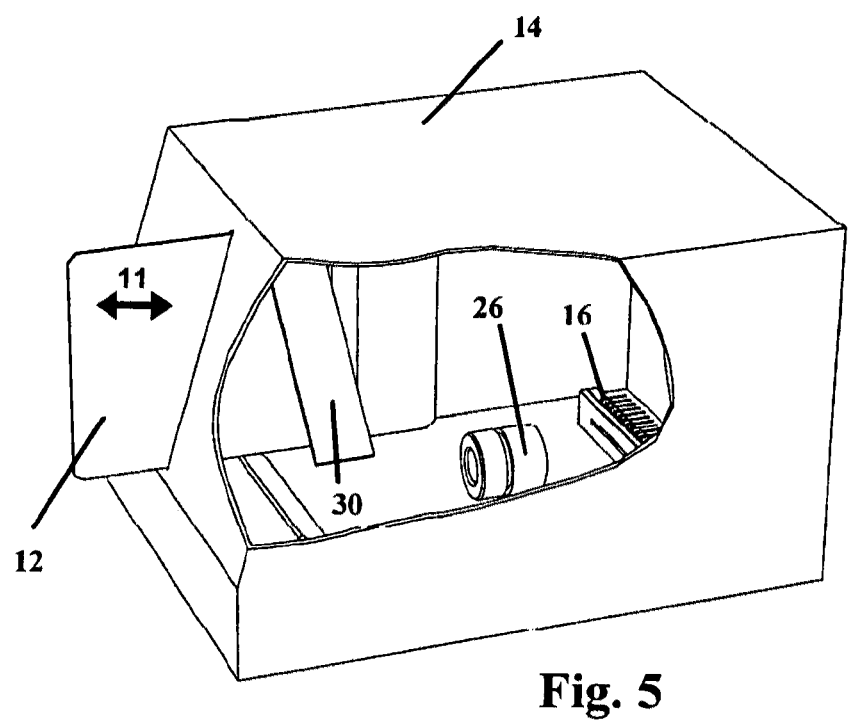
FIG. 5 shows a cutaway view of the casing which would surround the device and with the circuit board removed, and which darkens the flowpath and enables the employment of multiple individual LED or light source projections to capture different images of both sides of the card.
Figure 6:
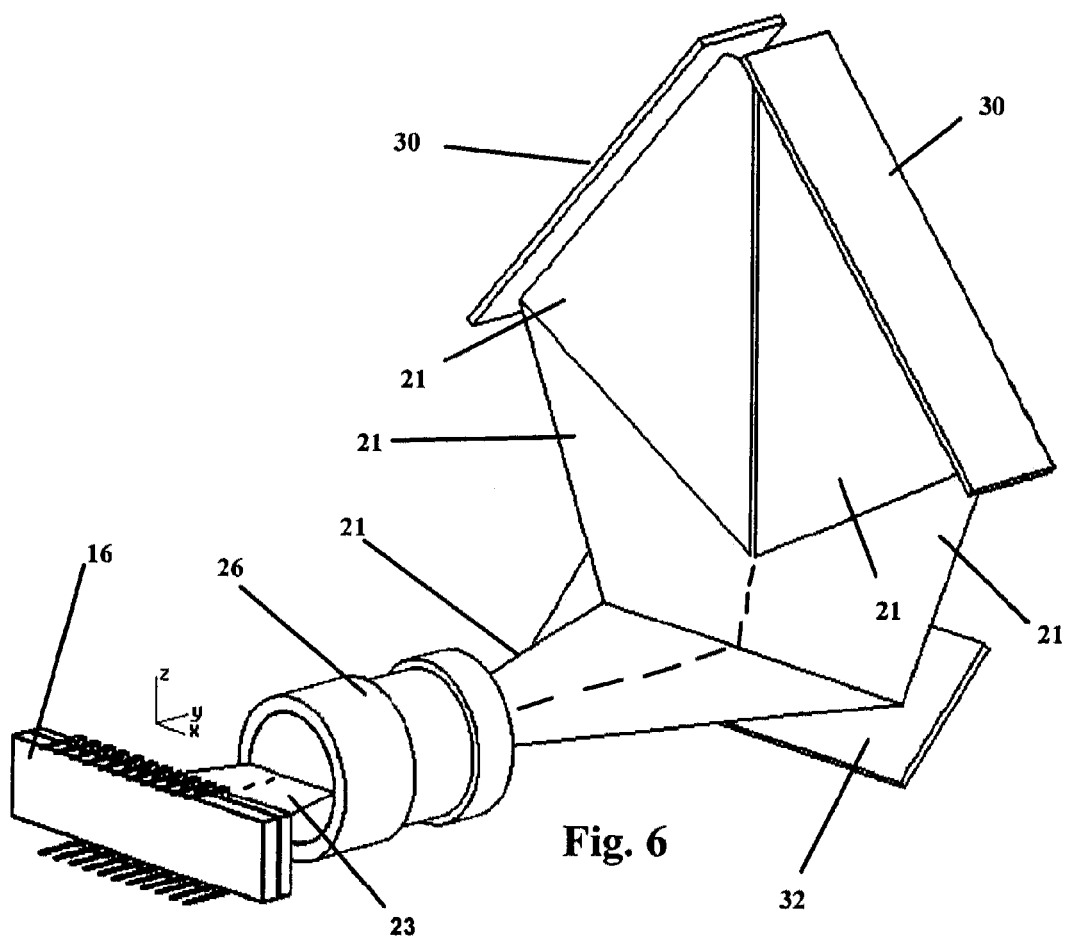
FIG. 6 is a rendition of the planar projections of the card surfaces in sections to a final horizontally disposed mirror reflecting sections through a refracting lens to the imager.
Figure 7:
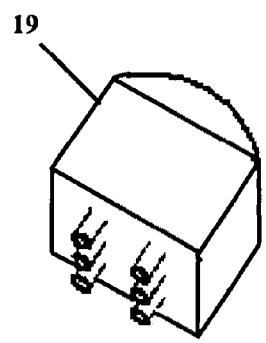
FIG. 7 depicts the magnetic strip reader.
Figure 10:
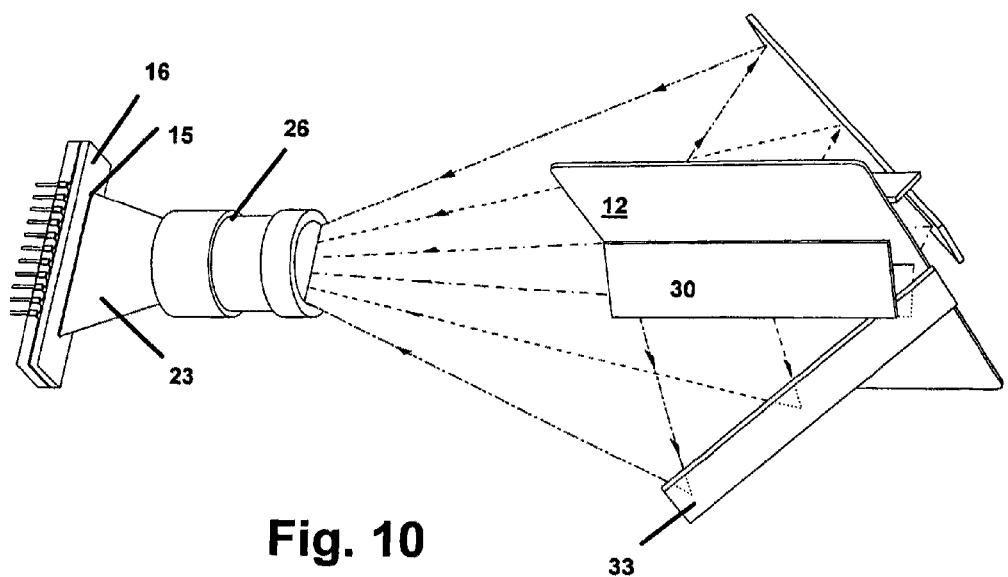
FIG. 10 depicts another means to concurrently communicate segments of both sides of the card to the imager during periods of illumination from that of FIGS. 4 and 6.

In operation, a two-sided image or concurrent individual images of both sides of a document such as an ID card 12 or license, or passport, as shown in FIG. 3, is assembled from segments communicated to and captured by the imager 16. As depicted in FIGS. 4 and 6 and 10, segments forming both assembled images of the card 12, during capture traveling along the linear flowpath 11, are concurrently communicated to the imager 16 using means to reflect both sides concurrently into the lens 26 which focuses segments from both sides of the card 12 to assemble both images in each respective spectrum. The arrangement of components in FIGS. 4, 6, and 10, are the currently preferred means to communicated segmental images of both side surfaces of the card 12 upon the imager 16 during travel of the card 12 into and out of the housing 14. As shown in FIGS. 4 and 6, one especially preferred mode providing means to communicate segmented images of the two sides of the card 12 upon the imager 16 is provided by angled reflective mirrors 30 which communicate images of segmented portions of each side of the ID card 12 or license to a horizontal mirror 32 and through a lens 26, to the imager 16 in sequence. As the LED's strobe in their respective spectrum, during passages along the flowpath, segmental images in each spectrum are thereby communicated to the imager 16.

As depicted in FIG. 10, in a another mode of the device 10, the angled reflective mirrors 30 may be positioned in other arrangements to communicate the segmental images to the imager 16. In FIG. 10, the angled reflective mirrors 30 are parallel to the linear translational linear flowpath 11 of the card 12 and reflect segmental images to two lower angled mirrors 33 which replace the horizontal mirror 32. The lower angled mirrors 33 project the images though the lense 26 to the imager 16. Those skilled in the art will realize once educated by this specification that other means to concurrently communicate segmented portions of both sides of the translating card 12 to the imager 16 can be employed and such are anticipated. However, the current preferred mode employs the device 10 as depicted in FIGS. 4 and 9 wherein the angled reflective mirrors 30 are positioned at inclining angles toward the top of the card 12 adjacent to the linear flowpath 11, and the horizontal mirror is positioned traverse to the linear flowpath 11 of the card 12 underneath it. As noted elsewhere this arrangement or one similar reduces the footprint of the device 10 making employable in limited space areas.

If the reader 19 is employed, data from the magnetic strip 18 and/or data extracted by software form the assembled images of the bar code 20 may also be captured thereby making the data encoded therein immediately available for comparison with captured images of the card 12 in the various spectrums, thereby providing a concurrent plurality of information for further verification of the authenticity and validity of the ID card 12 itself.

In the scanning or imaging process, to capture segmented images of both sides of the card 12 while traversing in and out of the linear flowpath 11, the device 10 employs a unique imaging technology using LED's 28 or other spectrum-specific lighting means inside the housing 14 to render images on the imager 16 to capture digital images of both sides of the card 12 in multiple images in a plurality of light wavelengths. The LED's 28 shown in FIG. 1 and FIG. 8 mounted on a circuit board 29 are illuminated in a sequence, individually or combined, to thereby illuminate both sides of the card 12 as it travels the linear flowpath 11 in and out of the device 10.

Each time an LED 28 illuminates for a duration, the card 12 so illuminated reflects an image of a segment of the card 12 passing each of a pair of angled reflective mirrors 30. This segmented illumination may be done by stopping the card 12 for moments during its traverse of the linear flowpath 11 or by a fast sequential strobing of the card 12 while the card 12 moves in and out of the linear flowpath 11.

Since images are captured during both directions of traverse of the card 12 the duration to capture segmented images is doubled over just capturing the images in one direction. Further, because the card 12 is imaged in both directions, should hidden indicia be such that it fluoresces under a certain spectrum of light and continues to glow thereafter for a duration, the LED emitting this spectrum would be employed last, as the card 12 is exiting the housing 14 so that the glowing ink does not damage other images in other spectrums which might be taken after such illumination. The two-way segmented imaging of the card 12 thus is most important in this aspect.

The angled reflective mirrors 30 are each positioned to reflect the segment of the card 12 during any such illumination period of time that the card 12 traverses the linear flowpath 11 through other mirrors and the lens 26 to the imager 16. This enables the device concurrently, in real time, to capture images of both sides of the ID card 12 in a registered position relative to each other, using a plurality of spectrum-specific light sources. Currently a plurality of five different light sources from LED's adapted to emit light at specific points in the spectrum, are employed; however, others are anticipated within the scope of this application. As noted, the LED's may strobe quickly singularly or in combination to capture certain images to uncover the hidden indicia on the card 12 while it moves, or the card 12 may be stopped momentarily along the linear flowpath 11 to allow for segments under each spectrum of each segment to be captured by the imager 16.

This employment of sequential emissions of light onto the card 12 at different spectrums enables the imager 16 of the device 10 not only to image and store readily viewable informational indicia such as barcode 20 and text 22, but, as noted, also allows the device 10 to image and capture hidden authentication and validation indicia which only illuminates or fluoresces for capture by the imager 16 under certain light spectrums. Inks which either fluoresce after illumination for a period, or reflect light and become viewable under certain light spectrums, are being employed on a widening scale to provide means to authenticate and validate ID's such as licenses. This is currently done by hand by the TSA with drivers' licenses. This ability to capture one or a plurality of such hidden features and store them for comparison or viewing by the user, is therefore a very important aspect provided by the device 10 and method hereon.

As noted, the angled reflective mirrors 30 positioned adjacent to the flowpath of the card 12 will reflect a segment of the card 12 to the imager 16 during each illumination of the card 12 by any one or combination of the spectrum-specific LED's. The entire images of both sides of the card 12 as depicted in FIG. 3 are assembled electronically by a connected data processor and software adapted to the task from the segments stored in memory. The illumination process of each segment of the card 12 as it moves in and along the linear flowpath 11, is accomplished by illuminating the ID card 12 for individual time durations in one or a plurality of light spectrums such as UV (365 nm) Blue (470 nm) Green (525 nm) Red (625 nm) IR (850 nm). Each segmental image in each single or combined light spectrum is reflected to the imager 12 by the aligned mirrors 30 and 32, and through lens 26 which focuses the segments onto the capturing portion of the imager 16. Images can be assembled in five or more wavelengths by strobing the LED's 28 for short time durations as the card 12 moves past the angled reflective mirrors 30.

Since each ID can have any number of hidden authenticating features that are imageable only under certain light-spectrums, the device 10 allows for multiple ways to capture and employ such authenticating indica by imaging of the card 12 in at least five spectrums and more when the images captured by the imager 16 and communicated to the data processor are combined electronically to yield assembled images. Because both sides of the card 12 are imaged concurrently for each segmental image, the images of both sides of the card are in registered positions relative to one another. This allows for comparison of the specific positions of indica points on both sides of the card 12 which is also important since equipment used to forge such documents is frequently inexpensive and unable to accurately position such indica points to the scale that very sophisticated and expensive printing equipment can. By comparing the points or positions of location of specific indica on both sides of the card 12 the device 10 can provide another means to spot forgeries.

Employing the plurality of LED's 28 to project individual light spectrums for concurrent or sequential imaging of the card 12, the device illuminates each section imaged, at least in one spectrum and preferably in all available, for short respective time segments. The reflected segmented images of both sides of the ID card 12 then follow the unique optical path to communicate small segmented image portions to the imager 16 for digitizing and communication to a data processor. This unique concurrent reflective path allows for a single imager 16 to be employed to capture both sides of the card image. This is most important to allowing for significantly reduced calibration of the device 10 from conventional scanners.

As can be seen in FIGS. 1-2 and 4 and 6, the LED's 28 illuminate both sides of the ID card 12 to illuminate the image thereon which is communicated to a pair of angled reflective mirrors 30 relative to the flat side surfaces of the card 12. As can be seen in FIGS. 4 and 6, the two angled reflective mirrors 30 are at substantially a 45-degree angle relative to the card 12 and receive the reflected light from the card 12 and communicate the segment of the image captured by the width of the angled reflective mirrors 30 to a horizontally positioned mirror 32 which is best positioned underneath the circuit board 31 in order to conserve space as best shown in FIGS. 8-9. The axis of the horizontal mirror 32 is substantially normal to the two parallel flat surfaces of the card 12 above or adjacent to the horizontal mirror 32.

The two reflected images of illuminated segments of both sides of the ID card 12, reflected from the angled reflective mirrors 30 onto the horizontal mirror 32, (or lower angled mirrors 33 if employed) are then refracted from the wider reflected image communication 21 shown in FIG. 6, through a lens 26 which yields a narrower projection 23 of the segmental images of both sides of the card 12, onto the linear narrow imaging area 15 of the electronic imager 16 for conversion to digital image format and storage in onboard memory.

Software adapted to the task, onboard or networked to the device 10, can be employed to ascertain optical character recognition of the text 22, electronic information in the mag strip 18, and stored in the bar code 20, and electronically assemble individual images each side of the card 12 in the different light wavelengths sequentially emitted by the LED's, to ascertain the presence of required validation or authenticating indica or markings on the card 12 and to compare it with the electronic information stored in the bar code 20 and mag strip 18. Those skilled in the art will realize that software may be adapted to the task to look for any number of individual identifiers provided by the visible and spectrum-illuminated images so assembled and the device 10 itself may allow for a great increase in intricate authentication and validation schemes that may be employable using both visible and spectrum-specific indicia.

Employing the various assembled images of both normal-light visible and spectrum-specific visible indicia, those images may be compared and inspected using software or the human eye on occasions if the images are simply projected onto a screen to ascertain the authenticity and validity of the driver's license or other ID card 12, and also to ascertain if the holder is sought for any reason by authorities.

As can be seen in FIG. 9, the novel arrangement of the reflective pair of angled reflective mirrors 30 to a horizontal mirror 32 below the linear flowpath 11 of the ID card 12, allows for a very small footprint for the device 10. Using the plurality of light-emitting means and other means to read printed and electronic information on the ID card 12, in concurrently assembled images of segments, allows for authentication of the ID card quickly and easily.

While all of the fundamental characteristics and features of the two-sided ID scanner and imager have been described herein, with reference to particular embodiments thereof, a latitude of modification, various changes and substitutions are intended in the foregoing disclosure, and it will be apparent that in some instances some features of the invention will be employed without a corresponding use of other features without departing from the scope of the invention as set forth. It should be understood that such substitutions, modifications, and variations may be made by those skilled in the art without departing from the spirit or scope of the invention. Consequently, all such modifications and variations are included within the scope of the invention as defined herein.

What is claimed is:

1. A document scanner, comprising:
    a housing having a substantially darkened interior cavity;
    means to translate a document having two opposing side surfaces, in a defined path into and out of said interior cavity;
    said defined path having a beginning point and a termination point;
    means to illuminate said document during travel along said defined path;
    a pair of mirrors, one each of said pair at an angled position adjacent to each of a respective one of said two opposing side surfaces of said document in said defined path;
    a secondary mirror portioned traverse to said document and said defined path, said secondary mirror having an angle adapted to intersect reflections from both of said pair of mirrors and communicate them, to the first end of a lens;
    said lens adapted to project a secondary image of both of said two opposing side surfaces to a means to capture electronic images;
    a data processor communicating with said means to capture an electronic images, said data processor having software adapted to process said electronic images of said two opposing side surfaces; and
    whereby one or both of said two opposing side surfaces of a said document inserted into said scanner, may be processed by said data processor for storage in electronic memory or projection on said video display.

2. The document scanner of claim 1, wherein said means to illuminate said document during travel along said defined path comprises:
    a plurality of illumination components, each said illumination component when energized, emitting light at a different individual light spectrum;
    each of said illumination components sequentially illuminating said document for an illumination duration;
    each said illumination duration generating a communication a said image of each of said two opposing side surfaces; and
    whereby indicia visible solely when illuminated at one of said individual light spectrums, is rendered visible during a said illumination duration at said one of said individual light spectrums and communicated to said means to capture electronic images for processing by said data processor for storage in electronic memory or projection on said video display as a separate image.

3. The document scanner of claim 2, wherein said means to illuminate said document during travel along said defined path comprises:
    said plurality of illumination components being energized sequentially for in a plurality of time segments during said travel along said defined path by said document;
    said image of each of said two opposing side surfaces, in each said plurality of individual light spectrums generated by each said illumination component being communicated to said data processor in segments of said two opposing side surfaces of said document; and
    said software adapted to assemble said electronic images of said two opposing side surfaces, in each of said plurality of light spectrums, from said segments.

4. The document scanner of claim 3, wherein said document halts translation along said defined path during each said time segment.

5. The document scanner of claim 4, wherein said individual light spectrums emitted by said illumination components include UV (365 nm) Blue (470 nm) Green (525 nm) Red (625 nm) and IR (850 nm).

6. The document scanner of claim 2, wherein said individual light spectrums emitted by said illumination components include UV (365 nm) Blue (470 nm) Green (525 nm) Red (625 nm) and IR (850 nm).

7. The document scanner of claim 1, wherein said means to illuminate said document during travel along said defined path comprises:

said means to illuminate said document having an illumination component which when energized emits light to thereby illuminate said document during travel along said defined path;

said illumination component being energized for time segments during said travel along said defined path by said document;

said image of each of said two opposing side surfaces, being communicated to said data processor in segments of said two opposing side surfaces of said document; and said software adapted to assemble said electronic images of said two opposing side surfaces from said segments.

8. The document scanner of claim 7, wherein said document halts translation along said defined path during each said time segment.

* * * * *